Patented July 10, 1951

2,559,669

UNITED STATES PATENT OFFICE 2,559,669

VAT DYES OF THE AZO ANTHRAQUINONE OXAZOLE SERIES

Herman E. Schroeder, Wilmington, Del., and Joseph Deinet, Glassboro, N. J., assignors to E. I. du Pont de Nemours & Company, Wilmington, Del., a corporation of Delaware No Drawing. Application June 17, 1949, Serial No. 99,873

6 Claims. (Cl. 260—152)

This invention relates to the preparation of new and valuable vat dyes of the anthraquinone-oxazole series, and more particularly to new unsymmetrical azobiphenylcarbonylaminoanthraquinone compounds which contain in the molecule an anthraquinone-1,2(N)-oxazole group. The compounds of this invention have the general formula:

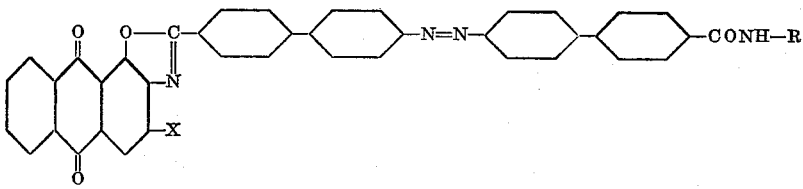

in which X stands for a member of the group consisting of hydrogen and halogen, and R stands for a vattable radical of the group consisting of the unsubstituted anthraquinonyl radical and the anthraquinonyl radicals carrying simple monovalent substituents of the type often introduced into anthraquinone vat dyes, such as halogen, particularly —Cl and —Br, methyl or methoxy groups and simple acylamino groups such as the benzoylamino or the thenoylamino,

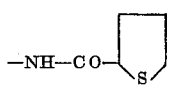

groups, which anthraquinonyl radicals are attached to the —CONH— group in an alpha position and the position ortho thereto does not carry a halogen atom.

It has been recognized for many years that, in the dyes of the anthraquinone series, those in the yellow range are generally deficient in their fastness properties, more particularly with regard to fastness to light, although in general the dyes of the anthraquinone vat dye class are considered to have good fastness properties. Where yellow dyes have been found in the anthraquinone series which have good fastness properties, they are usually either dull or weak tinctorially, and therefore the various dyes in the anthraquinone vat dye class must be selected to answer the particular need at hand, balancing the question of fastness, brightness and tinctorial strength of the particular dyes available. In U. S. Patent 2,175,803 a group of symmetrical dianthraquinonediazoles, more particularly imidazoles, 1,2(N)-thiazoles and 2,1(N)-oxazoles which contain an azo group, are disclosed. These compounds dye vegetable fibers in yellowish shades and are said to exhibit good fastness to chlorine and boiling soap solution, and, in many cases, to light. It has been found, however, that these dyes are deficient in wet fastness, particularly in kier boiling, and in their vat stability. In U. S. Patent 2,228,455, a series of dianthraquinonylimides containing azo groups are disclosed which have relatively good fastness properties, but these dyes have been found to be dull and considerably weaker than the azole types of the first mentioned patent.

It is an object of the present invention to produce new and valuable dyes of the anthraquinone vat dye class which will dye cellulose and related fibers from the usual alkaline hydrosulfite vats in desirable yellow shades and which exhibit improved brightness, tinctorial strength and fastness properties as compared to the dyes of similar shade now available. It is a more specific object of the invention to produce anthraquinone vat dyes which are 4,4-substituted azobiphenyl compounds carrying both an anthraquinone-imino-carbonyl group and an anthraquinone-oxazole group.

These colors are best prepared in a non-reactive medium by condensing a 4,4'-azobiphenyl-4''-(1-halogen-2-carbonylamino-anthraquinone)-4'''-carbonyl chloride with an amino-anthraquinone under commonly used acylating conditions and treating the unsymmetrical amide thus obtained, either in situ or after isolation, with an acid binder and catalysts at elevated temperatures, usually in the range of 160°–220° C., to effect formation of the oxazole group. If desired, an azobiphenylcarbonylaminoanthraquinone carbonyl chloride may be condensed with a 2-amino-1-halogen anthraquinone and then ring closed to the oxazole in the same manner. The products may be conditioned for dyeing in the usual manner, such as by milling or acid pasting with or without purification by bleaching with sodium hypochlorite in the manner customarily employed in purifying vat dyes of the anthraquinone series. These new dyes are, in general, yellow-to-orange powders giving orange-brown solutions in sulfuric acid. They dye cotton in strong, bright yellow shades from alkaline hydrosulfite vats which are red-brown in color with a violet cast, and exhibit unusually good light fastness and excellent tinctorial strength. Their wet fastness is of the same high order as found in most anthraquinone vat colors. The dyes may be applied by the usual dyeing methods. They dye rapidly and exhaust well, building up to strong bright shades even when dyed at elevated temperatures, e. g., 80° C., not normally used in dyeing practice.

The following examples are given to illustrate the invention. The parts used are by weight.

*Example 1*

Twenty-six (26) parts of 4,4' - azobiphenyl - 4'' - (2 - carbonylamino - 1 - chloroanthraquinone - 4''' - carbonyl chloride are suspended in 400 parts of nitrobenzene; 0.4 part of pyridine and 13 parts of 1-amino-5-benzoylaminoanthraquinone are added while agitating and the mass is heated to 210° C. and maintained for one-quarter to one-half hour. After cooling to 50° C., 17 parts of sodium carbonate, 17 parts of potassium acetate, 0.5 part of copper acetate and 0.5 part of cuprous chloride are added, and the mass heated to 210° C. and maintained for 3 hours. It is then cooled, filtered off, washed with nitrobenzene, alcohol and hot water in turn, and dried. The resulting product forms a strong yellow powder. It gives an orange-brown color when dissolved in concentrated sulfuric acid, and with alkaline hydrosulfite it gives a red-brown vat from which cotton is dyed in bright yellow shades of very good fastness properties. This product, which shows extraordinary tinctorial strength and light fastness, is represented by the formula:

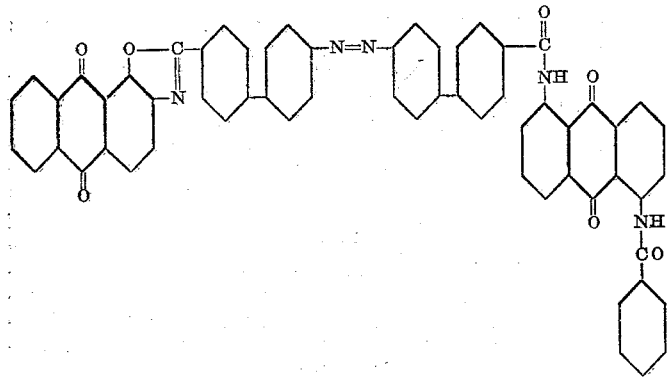

In place of the 1-amino-5-benzoylaminoanthraquinone employed in this example, the dibenzoylamino compounds such as 1-amino-5,8-dibenzoylaminoanthraquinone may be employed to give dyestuffs having properties similar to those described for the compound of this example.

*Example 2*

Twenty-five (25) parts of 4,4' - azobiphenyl - 4'' - (2 - carbonylamino - 1 - chloroanthraquinone) - 4''' - carbonyl chloride are suspended in 500 parts of nitrobenzene, 0.3 part of pyridine and 8.7 parts of 1-aminoanthraquinone are added while agitating, and the mass is heated to 210° C. and maintained for one-half hour. After cooling to 50° C., 15 parts of sodium carbonate, 15 parts of potassium acetate, 0.6 part of copper acetate and 0.5 part of cuprous chloride are added and the mass is heated to 210° C. and maintained for 3 hours. It is then cooled, filtered, washed with nitrobenzene, alcohol and hot water, in turn, and dried. The product forms a yellow powder. It gives an orange-brown color when dissolved in concentrated sulfuric acid. It gives a red-brown vat from which cotton is dyed in bright yellow shades of very good fastness properties. This product is tinctorially very strong and has excellent light fastness.

*Example 3*

Twenty-two (22) parts of 4,4' - azobiphenyl - 4'' - (2 - carbonylamino - 1 - chloroanthraquinone) - 4''' - carbonyl chloride are suspended in 500 parts of nitrobenzene, 0.3 part of pyridine and 12.5 parts of 1-amino-6-chloroanthraquinone are added while agitating, and the mass heated to 210° C. and maintained for one-half hour. After cooling to 50° C., 13 parts of sodium carbonate, 13 parts of potassium acetate, 0.5 part of copper acetate and 0.5 part of cuprous chloride are added and the mass heated to 210° C. and maintained for 3 hours. It is then cooled, filtered, washed with nitrobenzene, alcohol and hot water, in turn, and dried. The product forms a yellow powder. It gives an orange-brown vat from which cotton is dyed in bright yellow shades of very good fastness properties and excellent strength.

*Example 4*

Twenty-five (25) parts of 4,4' - azobiphenyl - 4'' - (2 - carbonylamino - 1 - chloroanthraquinone) - 4''' - carbonyl chloride are suspended in 500 parts of nitrobenzene, 0.3 part of pyridine and 8.7 parts of 2-aminoanthraquinone are added while agitating and the mass is heated to 210° C. and maintained for ½ hour. After cooling to 50° C., 15 parts of sodium carbonate, 15 parts of potassium acetate, 0.5 part of copper acetate and 0.5 part of cuprous chloride are added and the mass is heated to 210° C. and maintained for 3 hours. It is then cooled, filtered, washed with nitrobenzene, alcohol and hot water, in turn, and dried. The product forms a yellow powder, soluble in concentrated sulfuric acid with an orange-brown color. It gives a red-brown vat from which cotton is dyed in bright yellow shades of good fastness properties and high tinctorial strength.

*Example 5*

Forty (40) parts of 4,4'-azobiphenyl-4''-(2-carbonylamino - 1,3 - dibromoanthraquinone) - 4'''-carbonyl chloride are suspended in 600 parts of nitrobenzene, 0.3 part of pyridine and 17.5 parts of 1-amino-5-benzoylaminoanthraquinone are added while agitating, and the mass heated to 210° C. and maintained for one hour. After cooling to 50° C., 24 parts of sodium carbonate, 24 parts of potassium acetate, 1 part of copper acetate and 1 part of cuprous chloride are added and the mass heated to 210° C. and maintained for 3 hours. It is then cooled, filtered, washed with nitrobenzene. The filter cake is then steam distilled free from nitrobenzene, filtered, washed alkali-free and dried. The product obtained forms a yellow powder soluble in concentrated sulfuric acid with an orange-red-brown color. It gives a red-brown vat from which cotton is dyed in bright yellow shades of excellent fastness properties and is represented by the formula:

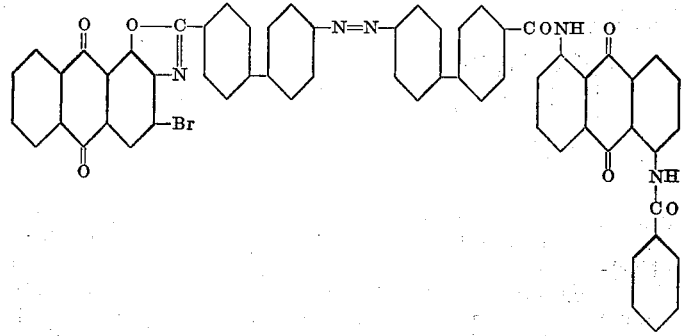

Example 6

Thirty-four (34) parts of 4,4'-azobiphenyl-4"-(2 - carbonylamino - 1 - chloroanthraquinone) - 4'''-carbonyl chloride are suspended in 600 parts of nitrobenzene, 0.2 part of pyridine and 12 parts of 1-amino-2-methylanthraquinone are added while agitating, and the mass heated to 210° C. and maintained for one hour. After cooling to 100° C., 20 parts of sodium carbonate, 20 parts of potassium acetate, 1 part of copper acetate and 1 part of cuprous chloride are added and the mixture is heated to 210° C. and maintained for 4 hours. It is then cooled, filtered, washed with nitrobenzene, alcohol and hot water, in turn, and dried. It forms a yellow powder vattable with sodium hydrosulfite and caustic soda, giving a red-brown solution from which cotton is dyed in bright yellow shades of good fastness properties.

Example 7

Twenty-five (25) parts of 4,4'-azobiphenyl-4"-(2-carbonylamino-1-chloroanthraquinone)-4'''-carbonyl chloride are suspended in 500 parts of nitrobenzene, 0.3 part of pyridine and 13.2 parts of 1-amino-4-benzoylaminoanthraquinone are added while agitating, and the mass heated to 210° C. and maintained for one-half hour. After cooling to 100° C., 18 parts of sodium carbonate, 18 parts of potassium acetate, 0.8 part of copper acetate and 0.8 part of cuprous chloride are added. The suspension is then heated to 210° C. and maintained for 3 hours. It is then cooled, filtered, washed with nitrobenzene, alcohol and hot water, in turn, and dried. It forms a dark yellow powder vattable with sodium hydrosulfite and caustic soda giving a red-brown solution (violet cast) from which cotton is dyed in bright yellow to orange shades of good fastness properties.

Example 8

Twenty-one (21) parts of 4,4'-azobiphenyl-4" - (2 - carbonylamino - 1 - chloroanthraquinone)-4'''-carbonyl chloride are suspended in 400 parts of nitrobenzene, 0.2 part of pyridine and 10.8 parts of 1-amino-5-(2-thenoylamino)-anthraquinone are added while agitating, and the mass is heated to 210° C. and maintained for one-half hour. After cooling to 80° C., 14 parts of sodium carbonate, 14 parts of potassium acetate, 0.5 part of copper acetate and 0.5 part of cuprous chloride are added. The mixture is heated to 210° C. and maintained for 3 hours. It is then cooled, filtered, washed with nitrobenzene, alcohol and hot water, in turn, and dried. It forms a yellow powder vattable with sodium hydrosulfite and caustic soda giving a red-brown vat from which cotton is dyed in bright yellow shades. The product, which is tinctorially very strong, is represented by the formula:

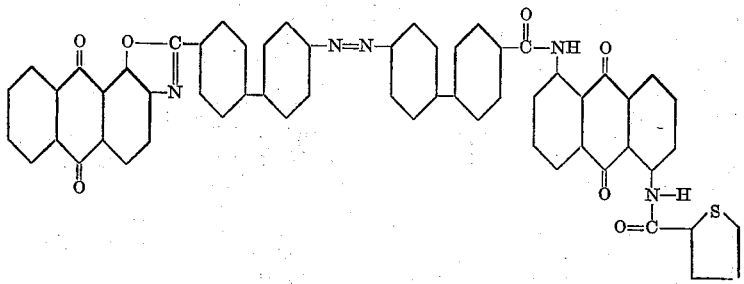

Example 9

Thirteen and six-tenths (13.6) parts of 4,4'-azobiphenyl-4" - (2 - carbonylamino - 1 - chloroanthraquinone)-4'''-carbonyl chloride are suspended in 300 parts of naphthalene at 100° C., 4.4 parts of 1-aminoanthraquinone are added while agitating, and the mass heated to 215° C. and maintained for one-half hour. After cooling to 100° C., 8 parts of sodium carbonate, 8 parts of potassium acetate, 0.2 part of copper acetate and 0.2 part of cuprous chloride are added and the mass heated to 2.15° C. and maintained for one and a half hours. It is then cooled to 100° C. and diluted with 600 parts of solvent naphtha, filtered, washed with solvent naphtha, alcohol and hot water, in turn, and dried. It forms a yellow powder vattable with sodium hydrosulfite and caustic soda giving a red-brown vat from which cotton is dyed in bright yellow shades. The product is apparently identical with that of Example 2.

Example 10

A mixture of 450 parts of nitrobenzene, 11.2 parts of 1-aminoanthraquinone, 0.1 part of pyridine and 32 parts of 4"-(1,2(N)-anthraquinone-oxazolyl)-azobiphenyl-4'''-carbonyl chloride was heated together to 150° C. and maintained at this temperature for one hour. The reaction mixture was then heated at 210° C. for two hours. After cooling, the mass was filtered, the cake was washed with nitrobenzene, then with alcohol, and dried. The product obtained forms a yellow powder and is represented by the formula:

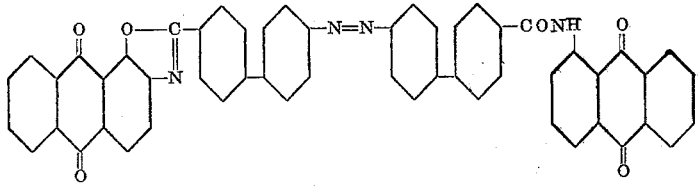

It gives an orange-brown color when dissolved in concentrated sulfuric acid and dyes cotton from a red-brown alkali hydrosulfite vat in bright yellow shades of good fastness properties.

The acid chloride employed in this example may be prepared by condensing one mol of 1-chloro-2-aminoanthraquinone with one mol of azobiphenyldicarbonyl chloride, followed by hydrolysis of the COCl to the COOH compound, ring closure to the oxazole, and acid chloride formation by means of thionyl chloride, all in situ in nitrobenzene, as more fully described in co-pending application Serial No. 99,872.

As illustrated in the foregoing examples, the products of this invention are oxazole amides of the anthraquinone series derived from 4,4'-azobiphenyl-4'',4'''-dicarboxylic acid. They are best prepared by treating an aminoanthraquinone with a preformed 4,4'-azobiphenyl-4''-(2-carbonylamino-1-halogen anthraquinone)-4'''-carbonyl chloride to form the amide in situ and then by adding catalysts to effect formation of the oxazole ring. Alternate methods such as those discussed above are also applicable. It is, for example, possible to prepare azobiphenyldicarbonyl chloride in situ, then add the amino halogen anthraquinone and the aminoanthraquinone separately in turn, and finally the catalysts, thus preparing the desired colors in excellent yield through but a single operation.

The 4,4'-azobiphenyl-4''-(2-carbonylamino-1-chloroanthraquinone)-4'''-carbonyl chloride or the 3-halogen substituted derivative thereof used as the starting material in the above examples are more particularly prepared by the process disclosed in our co-pending application Serial No. 99,871 by reacting an ortho-halogen-substituted beta-aminoanthraquinone with 4,4'-azobiphenyl-4'',4'''-dicarbonyl chloride in substantially equal molecular quantities in an inert solvent, preferably under anhydrous conditions and at temperatures of from 120° to 200° C. As pointed out above, these compounds may be isolated and then further condensed with an alpha-aminoanthraquinone compound, or the alpha-aminoanthraquinone compound can be added to the condensation mass and the reaction completed without isolation of the intermediate compound.

The 4,4'-azobiphenyldicarboxylic acid chloride may be readily prepared by the sodium hydroxide-glucose reduction of 4,4'-nitrophenylbenzoic acid and then reaction of the free acid compound or its sodium salt with thionyl chloride or phosphorus pentachloride.

The aminothenoylaminoanthraquinone compounds used in the above examples may be produced by the monothenoylation of the diaminoanthraquinone by the same procedure as employed in the monobenzoylation of a diaminoanthraquinone or by the thenoylation of an aminochloroanthraquinone with subsequent replacement of the chlorine by a free amino group in the same manner as the aminobenzoylaminoanthraquinone is produced from aminochloroanthraquinones. These compounds may also be prepared by the thenoylation of amino-nitro-anthraquinone compounds, followed by reduction of the nitro group.

In the production of the 4,4'-azobiphenyl-4''-(2-carbonylamino-1-halogenanthraquinone)-4'''-carbonyl chloride, the 1-chloro-(or bromo-)2-aminoanthraquinone and the 1,3-dichloro-2-aminoanthraquinone, the 1,3-dibromo-2-aminoanthraquinone, the 1-bromo-2-amino-3-chloroanthraquinone, the 1-chloro-2-amino-3-bromoanthraquinone may be employed. If it is desired that further halogen be present in the anthraquinone radical forming the oxazole portion of the molecule, higher halogen substituted 2-aminoanthraquinones may be employed, such as the 2-amino-1,3,6(or 1,3,7-)-trichloroanthraquinones.

To produce the dyes of this invention which exhibit good strength, brightness and fastness properties, it is essential that in the imide portion of the final dyestuff the anthraquinonyl radical is attached to the carbonylamino group in an alpha position. To prevent a second oxazole ring being formed at that end of the molecule, however, it is also essential that such anthraquinone radical does not contain halogen in a position ortho to the carbonylamino linkage. Otherwise, the anthraquinonyl radical may carry a benzoylamino or thenoylamino radical in any of the alpha positions, or it may contain further halogen, methyl or methoxy groups, the introduction of which is often desirable to make minor changes in the shade or application properties of the resulting dye. 1-amino-4-methoxyanthraquinone, which is a common anthraquinone intermediate, is illustrative of the methoxy substituted anthraquinones that may be employed in producing the dyes of this invention by the processes illustrated in the above examples.

We claim:
1. The compounds of the formula:

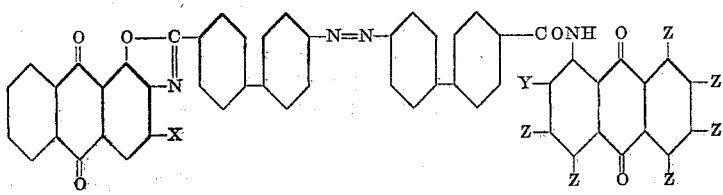

in which X stands for a member of the group consisting of hydrogen, chlorine and bromine, Y stands for a member of the group consisting of hydrogen, methyl, methoxy, benzoylamino and thenoylamino groups, and each Z stands for a member of the group consisting of hydrogen, chlorine, bromine, methyl, methoxy, benzoylamino and thenoylamino groups.

2. The compound of the formula:

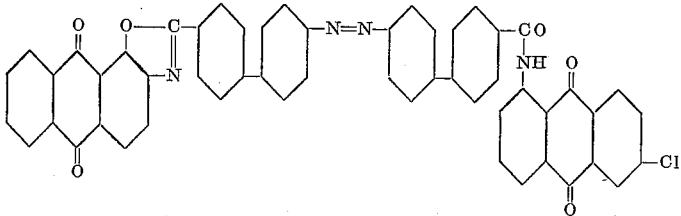

3. The compound of the formula:

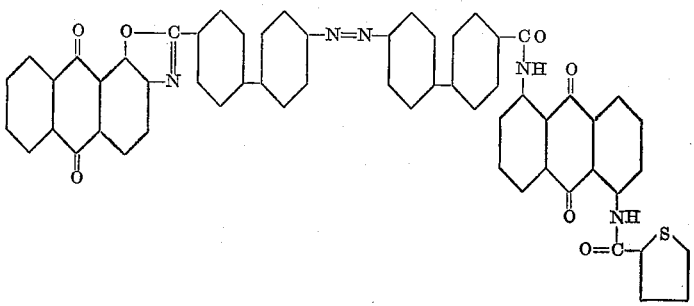

4. The compound of the formula:

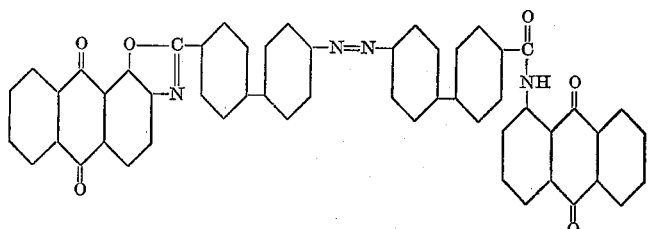

5. The compound of the formula:

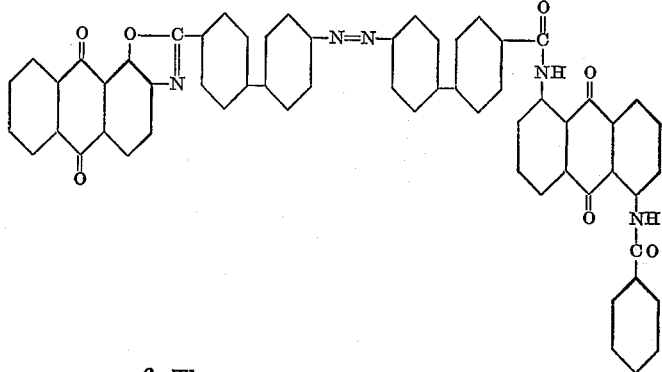

6. The compound of the formula:

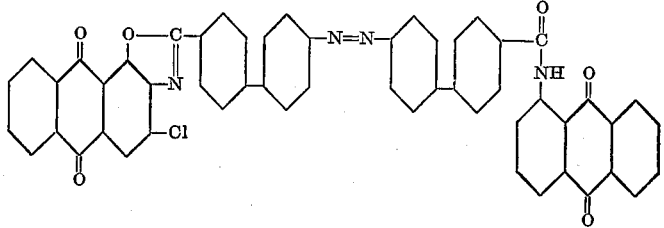

HERMAN E. SCHROEDER.
JOSEPH DEINET.

REFERENCES CITED

The following references are of record in the file of this patent:

UNITED STATES PATENTS

| Number | Name | Date |
|---|---|---|
| 2,175,803 | Honold et al. | Oct. 10, 1939 |
| 2,228,455 | Honold et al. | Jan. 14, 1941 |

FOREIGN PATENTS

| Number | Country | Date |
|---|---|---|
| 826,768 | France | Aug. 12, 1939 |
| 848,018 | France | July 17, 1939 |